US011236545B2

(12) United States Patent
Sonzini et al.

(10) Patent No.: US 11,236,545 B2
(45) Date of Patent: Feb. 1, 2022

(54) TUBULAR ELECTROMECHANICAL ACTUATOR, HOME-AUTOMATION INSTALLATION COMPRISING SUCH AN ACTUATOR, AND METHOD FOR ASSEMBLING SUCH AN ACTUATOR

(71) Applicant: SOMFY ACTIVITES SA, Cluses (FR)

(72) Inventors: Marc Sonzini, Allinges (FR); Florian Doche, Annecy (FR)

(73) Assignee: SOMFY ACTIVITES SA, Cluses (FR)

( * ) Notice: Subject to any disclaimer, the term of this patent is extended or adjusted under 35 U.S.C. 154(b) by 1 day.

(21) Appl. No.: 16/754,574

(22) PCT Filed: Oct. 9, 2018

(86) PCT No.: PCT/EP2018/077463
§ 371 (c)(1),
(2) Date: Apr. 8, 2020

(87) PCT Pub. No.: WO2019/072839
PCT Pub. Date: Apr. 18, 2019

(65) Prior Publication Data
US 2020/0347672 A1 Nov. 5, 2020

(30) Foreign Application Priority Data

Oct. 10, 2017 (FR) ...................................... 1759465

(51) Int. Cl.
*E06B 9/72* (2006.01)
*H02K 15/00* (2006.01)
(Continued)

(52) U.S. Cl.
CPC ................ *E06B 9/72* (2013.01); *E06B 9/171* (2013.01); *E06B 9/44* (2013.01); *H02K 15/14* (2013.01); *H02K 2207/03* (2013.01)

(58) Field of Classification Search
CPC ... E06B 9/40; E06B 9/68; E06B 9/171; E06B 9/72; E06B 9/725; E06B 9/50;
(Continued)

(56) References Cited

U.S. PATENT DOCUMENTS 6,842,966 B1 1/2005 Campbell
2010/0282890 A1* 11/2010 Ducornetz .............. E06B 9/174
242/404

(Continued)

FOREIGN PATENT DOCUMENTS

CN 101680265 A 3/2010
CN 101802341 A 8/2010
(Continued)

OTHER PUBLICATIONS

International Search Report, PCT/EP2018/077463, dated Jan. 23, 2019.
French Search Report, FR 1759465, dated Jun. 7, 2018.

*Primary Examiner* — Daniel P Cahn
(74) *Attorney, Agent, or Firm* — Nixon & Vanderhye

(57) ABSTRACT

A tubular electromechanical actuator includes an assembly, a casing and a closure element for closing off the casing. The assembly includes an electronic control unit, an electric motor, a reduction gear and an output shaft. The casing is hollow and configured to house the assembly. The casing includes a first end and a second end. The output shaft protrudes from the casing at the first end of the casing, in an assembled configuration of the actuator. The closure element protrudes from the casing at the second end of the casing, in the assembled configuration of the actuator. The actuator also includes an interface element. The interface element is arranged between the closure element and the electronic control unit. In addition, the interface element includes a housing containing an element for preventing play between the closure element and the interface element along the axial direction of the actuator.

14 Claims, 7 Drawing Sheets

(51) Int. Cl.
*E06B 9/171* (2006.01)
*E06B 9/44* (2006.01)
*H02K 15/14* (2006.01)

(58) Field of Classification Search
CPC ....... E06B 2009/6845; E06B 2009/725; E06B 2009/6872; E06B 9/80; E06B 2009/905; H02K 11/33; H02K 7/116; H02K 2207/03; B21F 11/005; B21F 3/02; B21F 35/00; F16F 1/04; G01B 11/08; G01B 11/24

See application file for complete search history.

(56) References Cited

U.S. PATENT DOCUMENTS

| | | | | |
|---|---|---|---|---|
| 2011/0203754 A1* | 8/2011 | Mullet | ...................... | E06B 9/72 160/405 |
| 2017/0241201 A1* | 8/2017 | Buccola, Jr. | ........... | H02K 7/003 |
| 2018/0202226 A1* | 7/2018 | Georgeault | ............... | E06B 9/32 |
| 2018/0259033 A1* | 9/2018 | Basutto | .................. | E06B 9/582 |

FOREIGN PATENT DOCUMENTS

| | | | |
|---|---|---|---|
| CN | 101815841 | A | 8/2010 |
| CN | 103948290 | A | 7/2014 |
| CN | 104727726 | A | 6/2015 |
| CN | 106593279 | A | 4/2017 |
| CN | 107002461 | A | 8/2017 |
| DE | 2014105933 | * | 1/2016 |
| EP | 0 976 910 | A2 | 2/2000 |
| EP | 1990897 | * | 5/2008 |
| EP | 1990897 | A1 | 11/2008 |
| FR | 2 983 368 | | 5/2013 |
| WO | WO 2006045724 | * | 5/2006 |
| WO | 2012/156471 | A1 | 11/2012 |
| WO | 2013/076256 | A2 | 5/2013 |

* cited by examiner

TUBULAR ELECTROMECHANICAL ACTUATOR, HOME-AUTOMATION INSTALLATION COMPRISING SUCH AN ACTUATOR, AND METHOD FOR ASSEMBLING SUCH AN ACTUATOR

BACKGROUND OF THE INVENTION

Field of the Invention

The present invention relates to a tubular electromechanical actuator, a closure or sun protection home automation installation comprising such an actuator, and a method for assembling such an actuator.

In general, the present invention relates to the field of concealing devices comprising a motorized driving device setting a screen in motion, between at least one first position and at least one second position.

Description of the Related Art

A motorized driving device comprises an electromechanical actuator for a movable element for closing, concealing or sun protection such as a shutter, door, gate, blind or any other equivalent material, hereinafter referred to as a screen.

Document FR 2,983,368 A1 is already known, which describes a tubular electromechanical actuator for a closure or sun protection home automation installation. The electromechanical actuator comprises an assembly and a casing. The assembly comprises an electronic control unit, an electric motor, a reduction gear and an output shaft. The casing is hollow and configured to house the assembly. The casing comprises a first end and a second end. The second end is opposite the first end. The output shaft protrudes past the casing at the first end of the casing, in an assembled configuration of the electromechanical actuator. The electromechanical actuator also comprises a closure element for the second end of the casing. The closure element protrudes past the casing at the second end of the casing, in the assembled configuration of the electromechanical actuator.

The assembly of such an electromechanical actuator provides axial travel of the electronic control unit, the electric motor and the reduction gear, relative to one another, following the introduction of the assembly inside the casing.

Furthermore, the assembly of such an electromechanical actuator provides a reaction of the axial play, during the assembly of the closure element.

However, this electromechanical actuator has the drawback of reacting the axial play by means of a crimping operation done at the first end of the casing, following the fastening of the closure element relative to the casing, so as to push in deformed areas of the casing inside the notches arranged in the reduction gear and to push back the reduction gear, the electric motor and the electronic control unit toward the closure element.

As a result, such an assembly configuration of an electromechanical actuator, in which an axial travel of the electronic control unit, the electric motor and the reduction gear, relative to one another, is provided, can present a risk of electrical disconnection of the electronic control unit relative to an electrical power cable and relative to the electric motor, in particular upon impact of the electromechanical actuator, which may occur during a manipulation or the transport of the electromechanical actuator, or during abnormal operation of the electromechanical actuator.

The electrical disconnection of the electronic control unit relative to the electrical power cable or relative to the electric motor causes an outage of the electromechanical actuator.

SUMMARY OF THE INVENTION

The present invention aims to address the aforementioned drawbacks and to propose a tubular electromechanical actuator, a closure or sun protection home automation installation comprising such an actuator, and a method for assembling such an actuator, making it possible to improve the holding of the members of the electromechanical actuator positioned inside the casing and to prevent the electrical disconnection of an electronic control unit relative to an electrical power cable and relative to an electric motor.

To that end, according to a first aspect, the present invention relates to a tubular electromechanical actuator for a closure or sun protection home automation installation, the electromechanical actuator comprising at least:
  an assembly, the assembly comprising:
    an electronic control unit,
    an electric motor,
    a reduction gear, and
    an output shaft,
  a casing, the casing being hollow and configured to house the assembly, the casing comprising a first end and a second end, the second end being opposite the first end, the output shaft protruding past the casing at the first end of the casing, in an assembled configuration of the electromechanical actuator, and
  a closure element of the second end of the casing, the closure element protruding past the casing at the second end of the casing, in the assembled configuration of the electromechanical actuator.

According to the invention, the electromechanical actuator also comprises an interface element, the interface element being arranged between the closure element and the electronic control unit. Furthermore, the interface element comprises a first accommodation, inside which an inhibiting element is positioned inhibiting the play between the closure element and the interface element, along the axial direction of the electromechanical actuator.

Thus, the inhibiting element of the play between the closure element and the interface element, along the axial direction of the electromechanical actuator, makes it possible to improve the holding of the members of the electromechanical actuator that are positioned inside the casing and to eliminate the risk of electrical disconnection of the electronic control unit with respect to an electrical power cable and with respect to the electric motor, in particular upon impact of the electromechanical actuator, which may occur during a manipulation or the transport of the electromechanical actuator, or during abnormal operation of the electromechanical actuator.

In this way, such a construction of the electromechanical actuator makes it possible to inhibit the play between the closure element and the interface element, along the axial direction of the electromechanical actuator, following the assembly of the electromechanical actuator, so as to guarantee a functional state of the electromechanical actuator, during different phases in the lifetime of the electromechanical actuator.

Furthermore, the inhibiting element makes it possible to block the translation of the interface element relative to the closure element.

According to one advantageous feature of the invention, the closure element comprises an accommodation emerging at a first face of the closure element and at a second face of the closure element, the accommodation of the closure element being positioned opposite the inhibiting element, in the assembled configuration of the electromechanical actuator, so as to allow a position adjustment of the inhibiting element from the outside of the closure element.

According to another advantageous feature of the invention, the inhibiting element is configured to cooperate with a face of the closure element, following a position adjustment of the inhibiting element relative to the closure element, along the axial direction of the electromechanical actuator, so as to inhibit the play between the closure element and the interface element.

According to another advantageous feature of the invention, the inhibiting element is a screw. Furthermore, the accommodation of the interface element is a bore.

According to another advantageous feature of the invention, the closure element comprises a stop configured to cooperate with the casing, at the second end of the casing, in the assembled configuration of the actuator.

According to another advantageous feature of the invention, the electromechanical actuator also comprises a retaining element, the retaining element being assembled at the first end of the casing, the retaining element comprising a first stop configured to cooperate with the assembly, in the assembled configuration of the electromechanical actuator.

According to another advantageous feature of the invention, the retaining element comprises a second stop configured to cooperate with the casing, at the first end of the casing, in the assembled configuration of the electromechanical actuator.

According to a second aspect, the invention relates to a home automation installation for closing or sun protection that comprises a screen able to be wound on a winding tube rotated by a tubular electromechanical actuator according to the invention.

This home automation installation has features and advantages similar to those previously described relative to the tubular electromechanical actuator described above.

According to a third aspect, the present invention relates to a method for assembling a tubular electromechanical actuator for a closure or sun protection home automation installation,
the electromechanical actuator comprising at least:
an assembly, the assembly comprising:
an electronic control unit,
an electric motor,
a reduction gear, and
an output shaft,
a casing, the casing being hollow and configured to house the assembly, the casing comprising a first end and a second end, the second end being opposite the first end, the output shaft protruding past the casing at the first end of the casing, in an assembled configuration of the electromechanical actuator, and
a closure element of the second end of the casing, the closure element protruding past the casing at the second end of the casing, in the assembled configuration of the electromechanical actuator.
The method comprises at least the following steps:
a) assembling the assembly to the outside of the casing,
b) introducing the assembly inside the casing, from the second end of the casing and until the output shaft protrudes relative to the first end of the casing.

According to the invention, the method also comprises at least:
after step a) for assembling the assembly and before step b) for introducing the assembly inside the casing, a step c) for assembling an interface element on the electronic control unit belonging to the assembly,
after step c) for assembling the interface element on the electronic control unit and after step b) for introducing the assembly inside the casing, a step d) for assembling the closure element on the casing, at the second end of the casing, such that the interface element is positioned between the closure element and the electronic control unit, and
after step d) for assembling the closure element on the casing, a step e) for inhibiting play between the closure element and the interface element, along the axial direction of the electromechanical actuator, by means of an inhibiting element positioned inside a housing arranged in the interface element.

This method for assembling a tubular electromechanical actuator has features and advantages similar to those previously described relative to the tubular electromechanical actuator according to the invention and as described above.

According to one advantageous feature of the invention, step e) for inhibiting play between the closure element and the interface element comprises a sub-step e1) for adjusting the position of the interface element relative to the closure element, along the axial direction of the electromechanical actuator.

According to another advantageous feature of the invention, in the case where the inhibiting element is a screw, sub-step e1) for adjusting the position of the interface element relative to the closure element is carried out through an unscrewing or screwing operation of the screw.

BRIEF DESCRIPTION OF THE DRAWINGS

Other particularities and advantages of the invention will also appear in the description below, done in reference to the appended drawings, provided as non-limiting examples.

Figure 4:
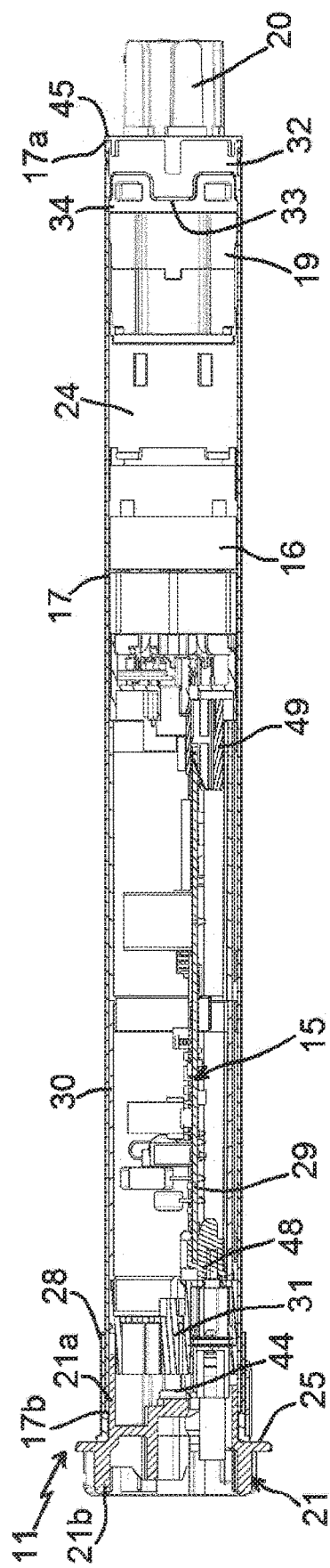
FIG. 4 is a sectional schematic view of the electromechanical actuator illustrated in FIG. 3, in an offset section plane relative to a longitudinal axis of the actuator.
Figure 5:
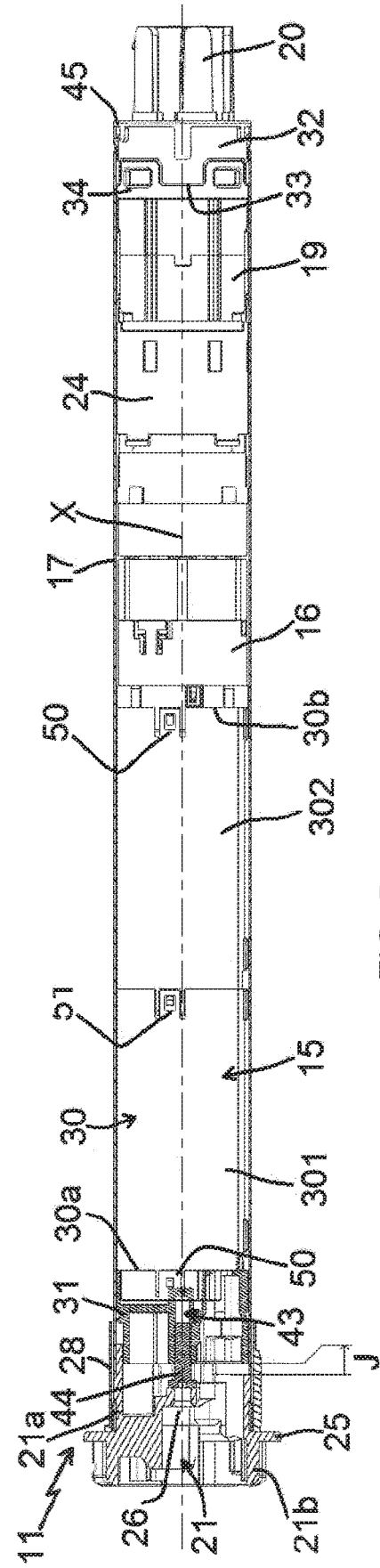
FIG. 5 is a partial sectional schematic view of the electromechanical actuator illustrated in FIG. 3, in a section plane passing through the longitudinal axis of the actuator.
Figure 10:
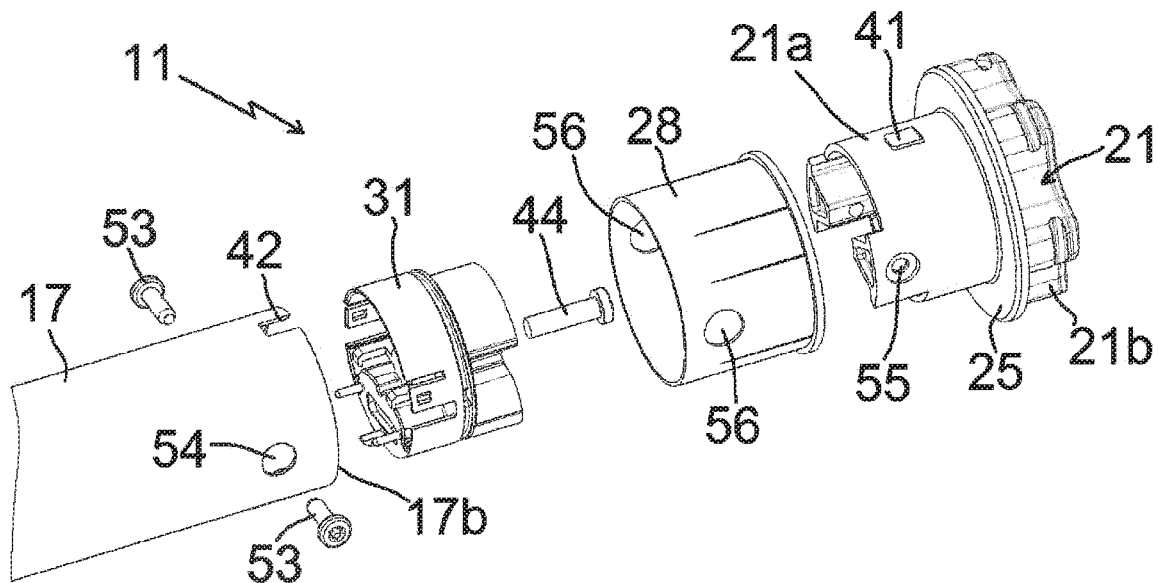
Figure 11:
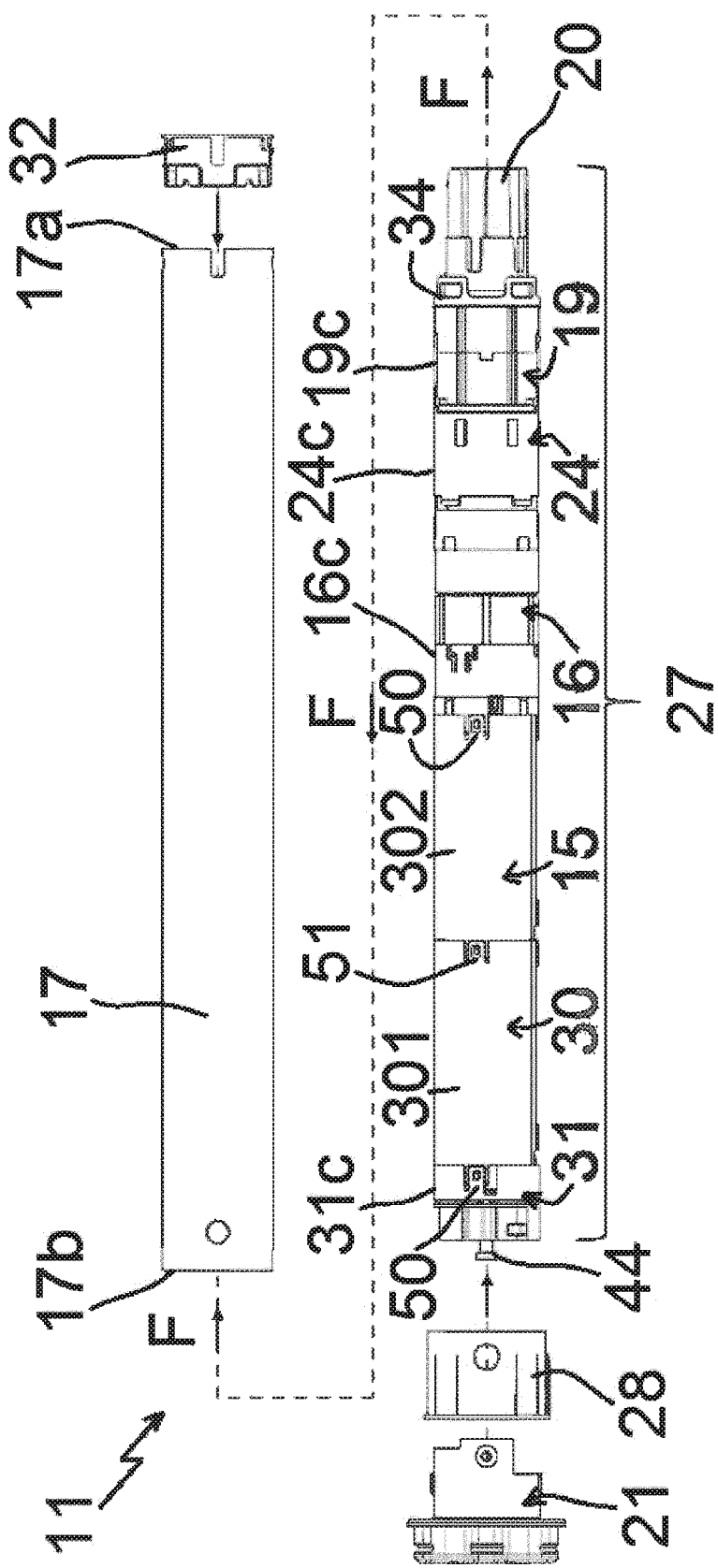
Figure 12:
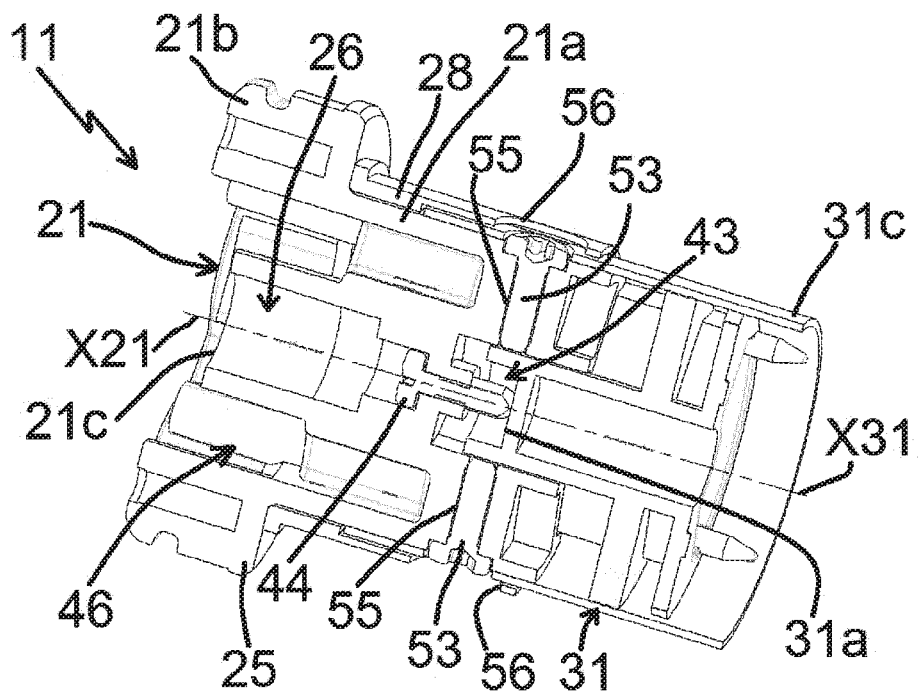
Figure 13:
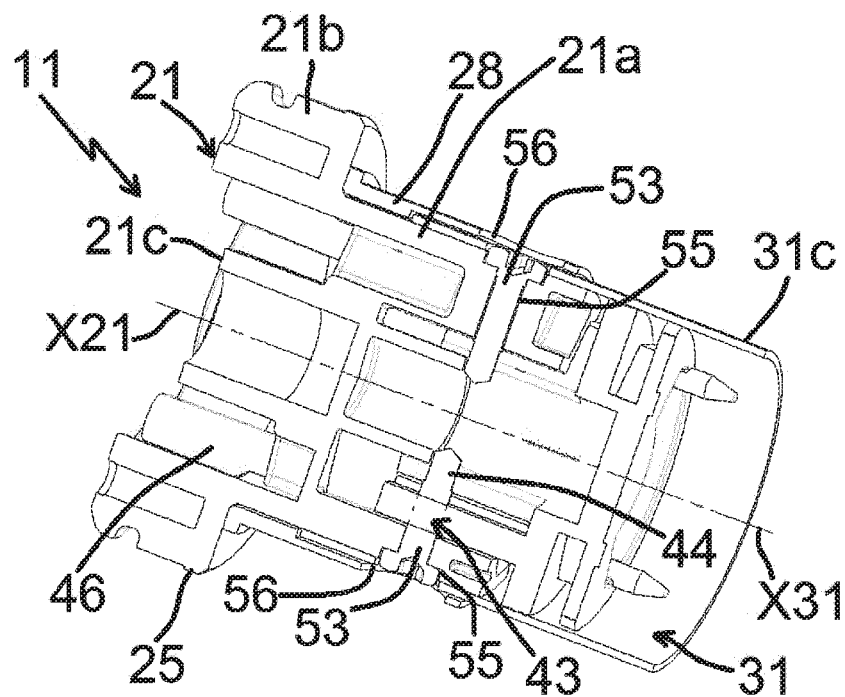

FIG. 10 is an exploded and perspective schematic view of part of the electromechanical actuator illustrated in FIGS. 4 and 5, showing part of the casing of the electromechanical actuator, a crown, the closure element, the interface element and the inhibiting element;

FIG. 11 is a schematic view of the electromechanical actuator illustrated in FIGS. 4 and 5, representative of an assembly method of this actuator;

FIG. 12 is a cross-sectional and perspective schematic view of a part of the electromechanical actuator illustrated in FIGS. 4 and 5, along a section plane that is offset relative to the longitudinal axis of the actuator, showing the closure element, the crown, the interface element and the inhibiting element, according to a second embodiment; and FIG. 13 is a cross-sectional and perspective schematic view of a part of the electromechanical actuator illustrated in FIGS. 4 and 5, showing the closure element, the crown, the interface element and the inhibiting element, according to a third embodiment.

DESCRIPTION OF THE PREFERRED EMBODIMENTS

Figure 1:
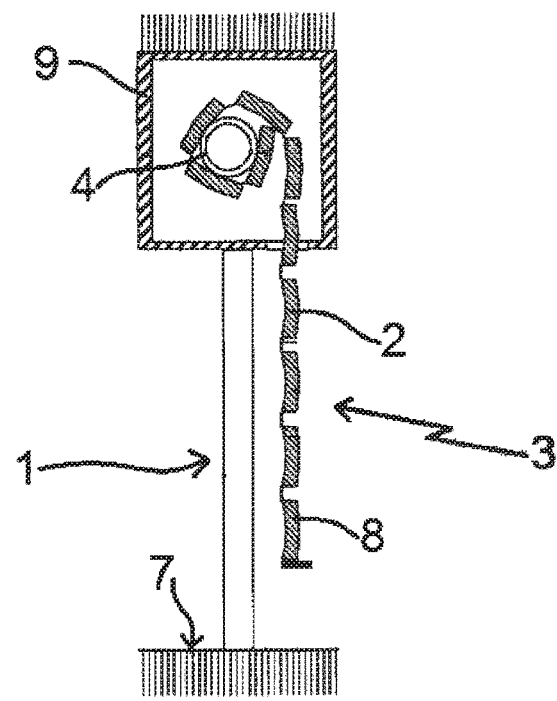
FIG. 1 is a cross-sectional schematic view of a home automation installation according to a first embodiment of the invention.
Figure 2:
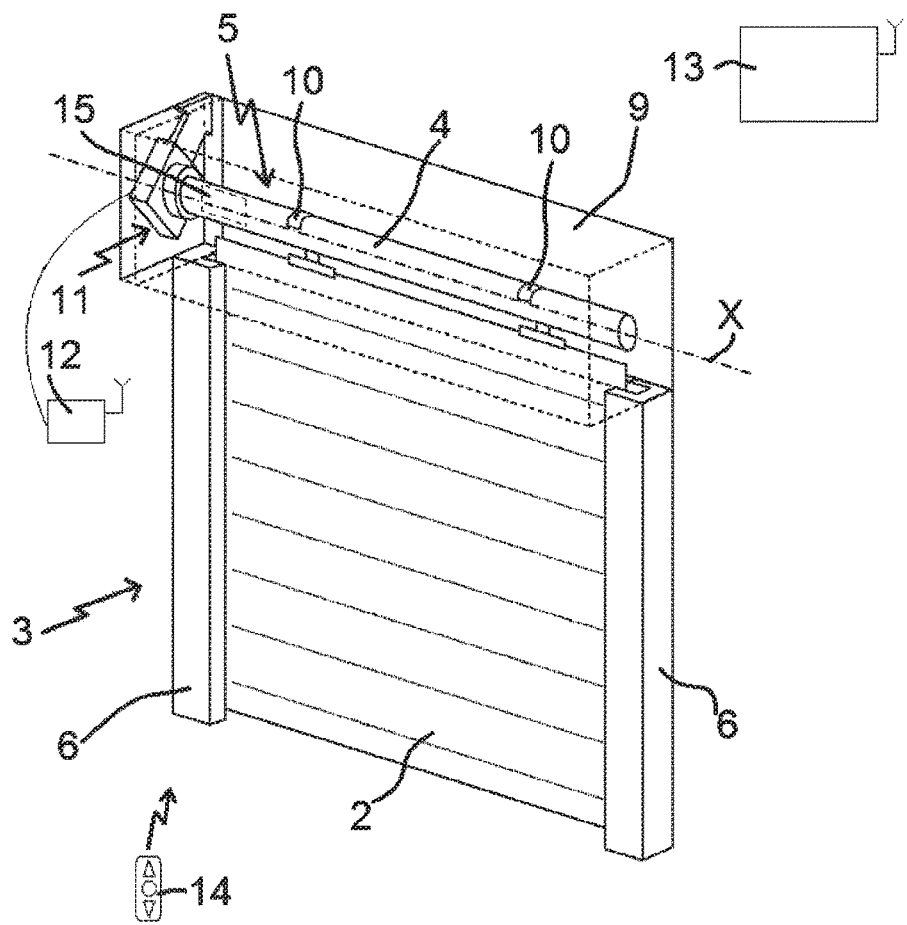
FIG. 2 is a perspective schematic view of the home automation installation illustrated in FIG. 1.

In reference to FIGS. 1 and 2, we first describe a home automation installation according to the invention and installed in a building comprising an opening 1, window or door, equipped with a screen 2 belonging to a concealing device 3, in particular a motorized rolling shutter.

The concealing device 3 can be a rolling shutter, a canvas blind or a blind with adjustable slats, or a rolling gate. The present invention applies to all types of concealing devices.

A rolling shutter according to a first embodiment of the invention is described in reference to FIGS. 1 and 2.

The screen 2 of the concealing device 3 is wound on a winding tube 4 driven by a motorized driving device 5 and movable between a wound position, in particular an upper position, and an unwound position, in particular a lower position.

The moving screen 2 of the concealing device 3 is a closure, concealing and/or sun protection screen, winding on the winding tube 4, the inner diameter of which is generally greater than the outer diameter of an electromechanical actuator 11, such that the electromechanical actuator 11 can be inserted into the winding tube 4 during the assembly of the concealing device 3.

The motorized driving device 5 comprises the electromechanical actuator 11, in particular of the tubular type, making it possible to set the winding tube 4 in rotation, so as to unwind or wind the screen 2 of the concealing device 3.

The concealing device 3 comprises the winding tube 4 for winding the screen 2. In the mounted state, the electromechanical actuator 11 is inserted into the winding tube 4.

In a known manner, the rolling shutter, which forms the concealing device 3, comprises an apron comprising horizontal slats articulated on one another, forming the screen 2 of the rolling shutter 3, and guided by two lateral guideways 6. These slats are joined when the apron 2 of the rolling shutter 3 reaches its unwound lower position.

In the case of a rolling shutter, the wound upper position corresponds to the bearing of a final end slat 8, which is, for example, L-shaped, of the apron 2 of the rolling shutter 3 against an edge of a box 9 of the rolling shutter 3, and the unwound lower position corresponds to the bearing of the final end slat 8 of the apron 2 of the rolling shutter 3 against a threshold 7 of the opening 1.

The first slat of the apron 2 of the rolling shutter 3, opposite the final end slat 8, is connected to the winding tube 4 using at least one articulation 10, in particular a fastener in strip form.

The winding tube 4 is positioned inside the box 9 of the rolling shutter 3. The apron 2 of the rolling shutter 3 winds and unwinds around the winding tube 4 and is housed at least partially inside the box 9.

In general, the box 9 is positioned above the opening 1, or in the upper part of the opening 1.

The motorized driving device 5 is controlled by a control unit. The control unit may, for example, be a local control unit 12, where the local control unit 12 can be connected through a wired or wireless connection with a central control unit 13. The central control unit 13 drives the local control unit 12, as well as other similar local control units distributed throughout the building.

The central control unit 13 can be in communication with a weather station located outside the building, in particular including one or more sensors that can be configured, for example, to determine a temperature, a brightness, or a wind speed.

A remote control 14, which can be a type of local control unit, and provided with a control keypad, which comprises selection and display elements, further allows a user to intervene on the electromechanical actuator 11 and/or the central control unit 13.

The motorized driving device 5 is, preferably, configured to carry out the unwinding or winding commands of the screen 2 of the concealing device 3, which may, in particular, be acquired by the remote control 14.

The electromechanical actuator 11 belonging to the home automation installation of FIGS. 1 and 2 is now described in reference to FIGS. 3 to 11.

Figure 3:
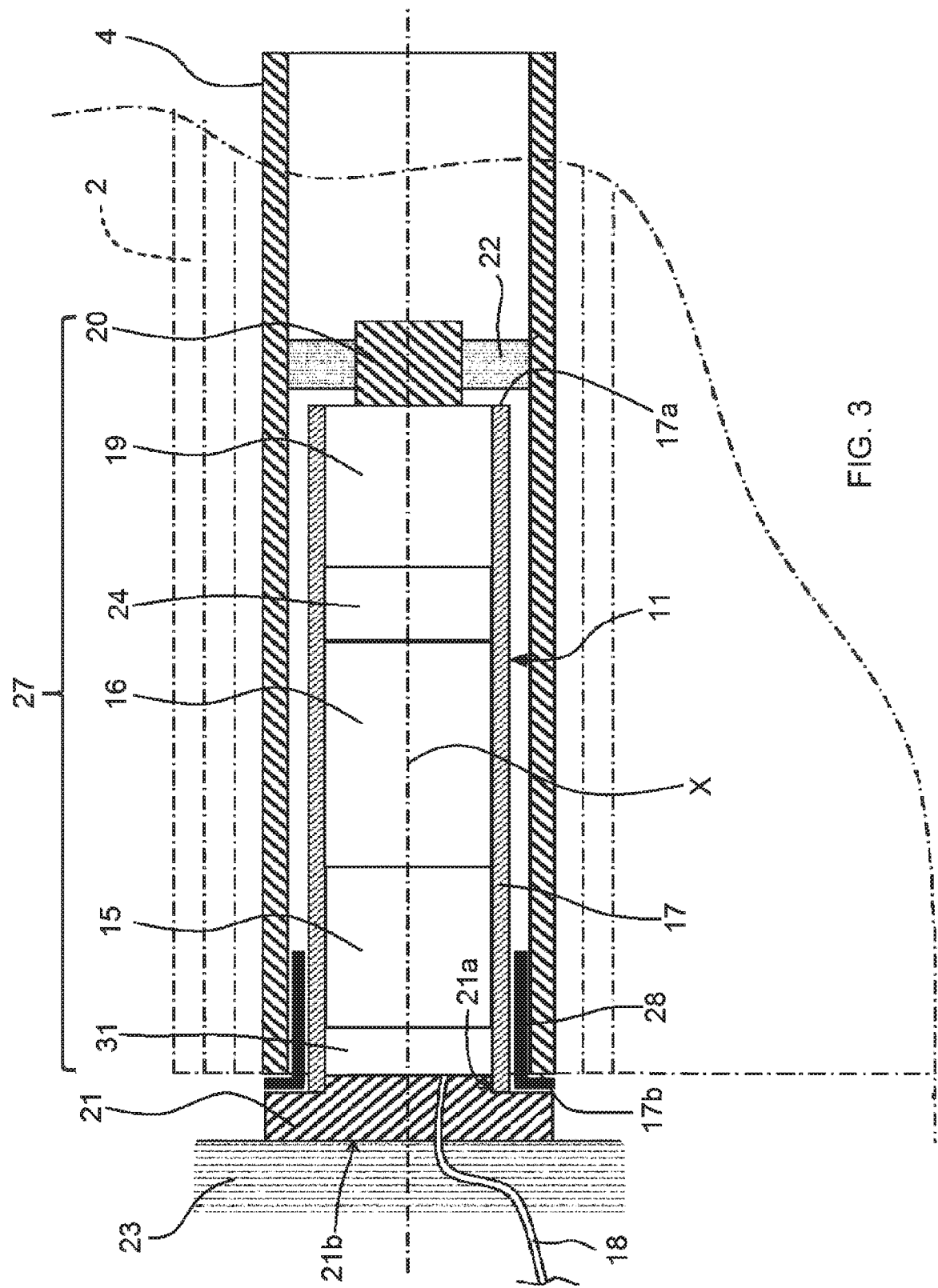
FIG. 3 is a partial and axial sectional schematic view of the home automation installation illustrated in FIGS. 1 and 2, showing a tubular electromechanical actuator of the installation.

The electromechanical actuator 11 comprises an electronic control unit 15, an electric motor 16, a reduction gear 19 and an output shaft 20, forming an assembly 27, as illustrated in FIGS. 3 and 11.

Thus, the assembly 27 is formed by members of the electromechanical actuator 11, of which the electronic control unit 15, the electric motor 16, the reduction gear 19 and the output shaft 20 are an integral part.

The electric motor 16 comprises a rotor and a stator, not shown, which are positioned coaxially around a rotation axis X, which is also the rotation axis of the winding tube 4 in the assembled configuration of the motorized driving device 5.

Here, the reduction gear 19 is of the type with gear pairs.

In practice, the electric motor 16 comprises an output shaft, not shown, configured to cooperate with an input shaft, not shown, of the reduction gear 19, in an assembled configuration of the electromechanical actuator 11.

Control means for controlling the electromechanical actuator 11, making it possible to move the screen 2 of the concealing device 3, comprise at least the electronic control unit 15. This electronic control unit 15 is able to operate the electric motor 16 of the electromechanical actuator 11 and, in particular, to allow the supply of electricity for the electric motor 16.

Thus, the electronic control unit 15, in particular, controls the electric motor 16, so as to open or close the screen 2, as previously described.

The electronic control unit 15 also comprises an order receiving module, in particular for wireless orders sent by an order transmitter, such as the remote control 14 designed to control the electromechanical actuator 11 or one of the local 12 or central 13 control units.

The order receiving module can also allow the reception of orders sent by wired means.

The control means of the electromechanical actuator 11 comprise hardware and/or software means.

As a non-limiting example, the hardware means may comprise at least one microcontroller.

The electromechanical actuator 11 also comprises a casing 17, which is, in particular, tubular.

The casing 17 of the electromechanical actuator 11 is, preferably, in cylindrical shape and, more specifically, has a circular section.

In one embodiment, the casing 17 is made from an electrically conductive material, in particular metallic.

The material of the casing of the electromechanical actuator is not limiting and may be different. It can, in particular, be a plastic.

The casing 17 is hollow and configured to house the assembly 27.

The casing 17 comprises a first end 17a and a second end 17b. The second end 17b is opposite the first end 17a.

The output shaft 20 of the electromechanical actuator 11 protrudes past the casing 17 at the first end 17a of the casing 17, in the assembled configuration of the electromechanical actuator 11.

Thus, the output shaft 20 of the electromechanical actuator 11 is positioned inside the winding tube 4 and at least partially outside the casing 17 of the electromechanical actuator 11.

Advantageously, the output shaft 20 of the electromechanical actuator 11 is coupled, by a connecting element 22, to the winding tube 4, in particular using a wheel-shaped connecting element.

The electromechanical actuator 11 is supplied with electricity by an electricity grid of the sector, or using a battery, which can, for example, be recharged by a photovoltaic panel. The electromechanical actuator 11 makes it possible to move the screen 2 of the concealing device 3.

Here, the electromechanical actuator 11 comprises an electrical power cable 18 allowing it to be supplied with electricity from the electricity grid of the sector.

Advantageously, the electromechanical actuator 11 also comprises a brake 24.

Here, the brake 24 of the electromechanical actuator 11 is an integral part of the assembly 27.

As a non-limiting example, the brake 24 may be a spring-loaded brake, a cam brake or an electromagnetic brake.

Advantageously, the electromechanical actuator 11 may also comprise an end-of-travel and/or obstacle detection device, which may be mechanical or electronic.

The electromechanical actuator 11 also comprises a closure element 21 for the second end 17b of the casing 17.

The closure element 21 protrudes past the casing 17 at the second end 17b of the casing 17, in the assembled configuration of the electromechanical actuator 11.

In practice, the closure element 21 is positioned at one end of the tubular electromechanical actuator 11 opposite that at which the output shaft 20 protrudes from the casing 17.

Here, the casing 17 of the electromechanical actuator 11 is fastened to a support 23, in particular a flange, of the box 9 of the concealing device 3 using the closure element 21 forming a torque pin, in particular a closure and torque-reacting head. In such a case where the closure element 21 forms a torque pin, the closure element 21 is also called a fixed point of the electromechanical actuator 11.

Advantageously, the closure element 21 is made from plastic and, more specifically, by molding.

In the exemplary embodiment illustrated in FIGS. 3 to 6 and 10 to 11, the closure element 21 is made in a single piece, in particular of the monobloc type.

Here, the closure element 21 is a revolving part.

The closure element 21 comprises a first part 21a configured to cooperate with the casing 17 of the electromechanical actuator 11 and a second part 21b configured to cooperate with the support 23.

At least the first part 21a of the closure element 21 is generally in cylindrical shape and is arranged inside the casing 17 of the electromechanical actuator 11, in the assembled configuration of the electromechanical actuator 11.

Advantageously, the closure element 21 comprises a stop 25 configured to cooperate with the casing 17, at the second end 17b of the casing 17, in the assembled configuration of the electromechanical actuator 11, in particular via a crown 28, as illustrated in FIGS. 4 to 6 and 10.

Thus, the stop 25 of the closure element 21 makes it possible to limit the pushing in of the first part 21a of the closure element 21 in the casing 17.

Furthermore, the stop 25 of the closure element 21 delimits the first and second parts 21a, 21b of the closure element 21.

Thus, only the first part 21a of the closure element 21 is arranged inside the casing 17 of the electromechanical actuator 11, following the fitting of the closure element 21 inside the casing 17, up to the stop 25.

Here, the stop 25 of the closure element 21 is made in the form of a flange ring, in particular with a cylindrical and planar shape.

In a variant, not shown, the closure element 21 comprises at least two parts. The first part of the closure element 21 comprises the first part 21a of the closure element 21 configured to cooperate with the casing 17 of the electromechanical actuator 11. The second part of the closure element 21 comprises the second part 21b of the closure element 21 configured to cooperate with the support 23.

Advantageously, the electromechanical actuator 11 comprises the crown 28. The crown 28 is arranged around the casing 17 of the electromechanical actuator 11 and at the second end 17b of the casing 17.

Here, the winding tube 4 is rotated about the rotation axis X and the casing 17 of the electromechanical actuator 11 supported by two pivot links. The first pivot link is produced at a first end of the winding tube 4 using the crown 28. The crown 28 thus makes it possible to produce a bearing. The second pivot link, not shown, is produced at a second end of the winding tube 4.

The electromechanical actuator 11 also comprises an interface element 31, as illustrated in FIGS. 4 to 8, 10 and 11. The interface element 31 is arranged between the closure element 21 and, more specifically, the first part 21a of the closure element 21, and the electronic control unit 15, along the direction of the rotation axis X.

Here, the interface element 31 of the electromechanical actuator 11 is an integral part of the assembly 27.

Here, and as illustrated in FIGS. 4 and 5, the electronic control unit 15, the electric motor 16, the reduction gear 19, the interface element 31 and the brake 24 are positioned inside the casing 17 of the electromechanical actuator 11.

Preferably, the members 31, 15, 16, 19, 24, 20 of the assembly 27 are assembled to one another in a predetermined order. The predetermined assembly order of the members 31, 15, 16, 19, 24, 20 of the assembly 27 first comprises the assembly of the interface element 31 with the electronic control unit 15, then the assembly of the electronic control unit 15 with the electric motor 16, then the assembly of the electric motor 16 with the reduction gear 19 and the assembly of the reduction gear 19 with the output shaft 20.

In the exemplary embodiment illustrated in FIGS. 3 to 5 and 11, the brake 24 is positioned between the electric motor 16 and the reduction gear 19.

In a variant, not shown, the brake 24 is positioned between the reduction gear 19 and the output shaft 20.

Here, each member 31, 15, 16, 19, 24, 20 of the assembly 27 has an axis that is combined with the rotation axis X, in the assembled configuration of the electromechanical actuator 11. The axis of each of the members 15, 16, 19, 24, 20 of the assembly 27 is not shown in FIGS. 3 to 11, so as to simplify the reading thereof.

Advantageously, the electronic control unit 15 comprises a housing 30 and an electronic board 29. The electronic board 29 is positioned inside the housing 30, in the assembled configuration of the electronic control unit 15.

Thus, the housing 30 of the electronic control unit 15 makes it possible to protect the electronic board 29, during the assembly of the electromechanical actuator 11 and following the assembly of the latter, as well as to ensure the rigidity of the assembly 27.

Furthermore, the housing 30 of the electronic control unit 15 makes it possible to electrically insulate the electronic board 29 relative to the casing 17.

Here and as illustrated in FIGS. 5 and 11, the housing 30 comprises a first section 301, made in the form of a first hollow tube, and a second section 302, made in the form of a second hollow tube.

The first and second sections 301, 302 are configured to house the electronic board 29, in the assembled configuration of the electronic control unit 15.

In a variant, not shown, the housing 30 comprises a single section.

The housing 30 of the electronic control unit 15 is, preferably, in cylindrical shape and, more specifically, has a circular section.

Preferably, the outer diameter of the housing 30 of the electronic control unit 15 is smaller than the inner diameter of the casing 17 of the electromechanical actuator 11, such that the housing 30 can be inserted into the casing 17 of the electromechanical actuator 11, during the assembly of the electromechanical actuator 11.

Here, the housing 30 of the electronic control unit 15 comprises a first end 30a configured to cooperate with the interface element 31 and a second end 30b configured to cooperate with the electric motor 16.

Furthermore, the electronic board 29 is configured to cooperate with an electrical connector 48 of the interface element 31, in the assembled configuration of the electromechanical actuator 11. Furthermore, the electronic board 29 is configured to cooperate with an electrical connector 49 of the electric motor 16, in the assembled configuration of the electromechanical actuator 11.

Advantageously, the electric motor 16 has a body 16c, as illustrated in FIG. 11. Furthermore, the body 16c of the electric motor 16 is, preferably, in cylindrical shape and, more specifically, has a circular section.

Preferably, the outer diameter of the body 16c of the electric motor 16 is smaller than the inner diameter of the casing 17 of the electromechanical actuator 11, such that the body 16c of the electric motor 16 can be inserted into the casing 17 of the electromechanical actuator 11, during the assembly of the electromechanical actuator 11.

Advantageously, the reduction gear 19 has a body 19c, as illustrated in FIG. 11. Furthermore, the body 19c of the reduction gear 19 is, preferably, in cylindrical shape and, more specifically, has a circular section.

Preferably, the outer diameter of the body 19c of the reduction gear 19 is smaller than the inner diameter of the casing 17 of the electromechanical actuator 11, such that the body 19c of the reduction gear 19 can be inserted into the casing 17 of the electromechanical actuator 11, during the assembly of the electromechanical actuator 11.

Advantageously, the interface element 31 has a body 31c, as illustrated in FIGS. 6 to 8 and 11. Furthermore, the body 31c of the interface element 31 is, preferably, in cylindrical shape and, more specifically, has a circular section.

Preferably, the outer diameter of the body 31c of the interface element 31 is smaller than the inner diameter of the casing 17 of the electromechanical actuator 11, such that the body 31c of the interface element 31 can be inserted into the casing 17 of the electromechanical actuator 11, during the assembly of the electromechanical actuator 11.

Advantageously, the brake 24 has a body 24c, as illustrated in FIG. 11. Furthermore, the body 24c of the brake 24 is, preferably, in cylindrical shape and, more specifically, has a circular section.

Preferably, the outer diameter of the body 24c of the brake 24 is smaller than the inner diameter of the casing 17 of the electromechanical actuator 11, such that the body 24c of the brake 24 can be inserted into the casing 17 of the electromechanical actuator 11, during the assembly of the electromechanical actuator 11.

Advantageously, the body 31c of the interface element 31, the housing 30 of the electronic control unit 15, the body 16c of the electric motor 16, the body 19c of the reduction gear 19 and, optionally, the body 24c of the brake 24 are assembled to one another using fastening elements 50, in particular by resilient snapping, so as to form the assembly 27.

Thus, the fastening elements 50 of the various members 31, 15, 16, 19, 24 of the assembly 27 make it possible to secure these members 31, 15, 16, 19, 24 to one another in rotation and in translation.

In this way, following the fastening of the members 31, 15, 16, 19, 24 of the assembly 27 relative to one another, the links between these members 31, 15, 16, 19, 24 of the assembly 27 have no axial travel, outside the assembly tolerances of the members 31, 15, 16, 19, 24 relative to one another.

Furthermore, the assembly of the various members 31, 15, 16, 19, 24 of the assembly 27 using fastening elements 50 makes it possible to introduce the assembly 27, in a single operation, into the casing 17, following a translational movement.

Here, the fastening elements 50 by resilient snapping are made using tongues and slugs. Each tongue comprises an opening configured to cooperate with one of the slugs.

Here, one of the members of the assembly 27 is assembled to another of the members of the assembly 27 using fastening elements 50 by resilient snapping, these fastening elements 50 can be four in number and angularly offset by an angle of 90° about the axis of rotation X.

The number and the angular position of the fastening elements by resilient snapping between two of the members of the assembly are not limiting and can be different, in particular, these fastening elements can be three in number and angularly offset by an angle of 120° about the axis of rotation.

Furthermore, the first section 301 and the second section 302 of the housing 30 of the electronic control unit 15 are also assembled to one another using fastening elements 51 by resilient snapping, so as to form the housing 30 and, more specifically, a portion of the assembly 27.

Thus, the fastening elements 51 by resilient snapping of the first and second sections 301, 302 of the housing 30 make it possible to secure these first and second sections 301, 302 to one another in rotation and in translation.

Preferably, the outer diameter, respectively, of the body 31c of the interface element 31, the housing 30 of the electronic control unit 15, the body 16c of the electric motor 16, the body 19c of the reduction gear 19 and the body 24c of the brake 24 have a same value.

Advantageously, the electromechanical actuator 11 also comprises a retaining element 32. The retaining element 32 is assembled at the first end 17a of the casing 17. The retaining element 32 comprises a first stop 33 configured to cooperate with the assembly 27 and, more specifically, with the reduction gear 19, in the assembled configuration of the electromechanical actuator 11.

Figure 9:
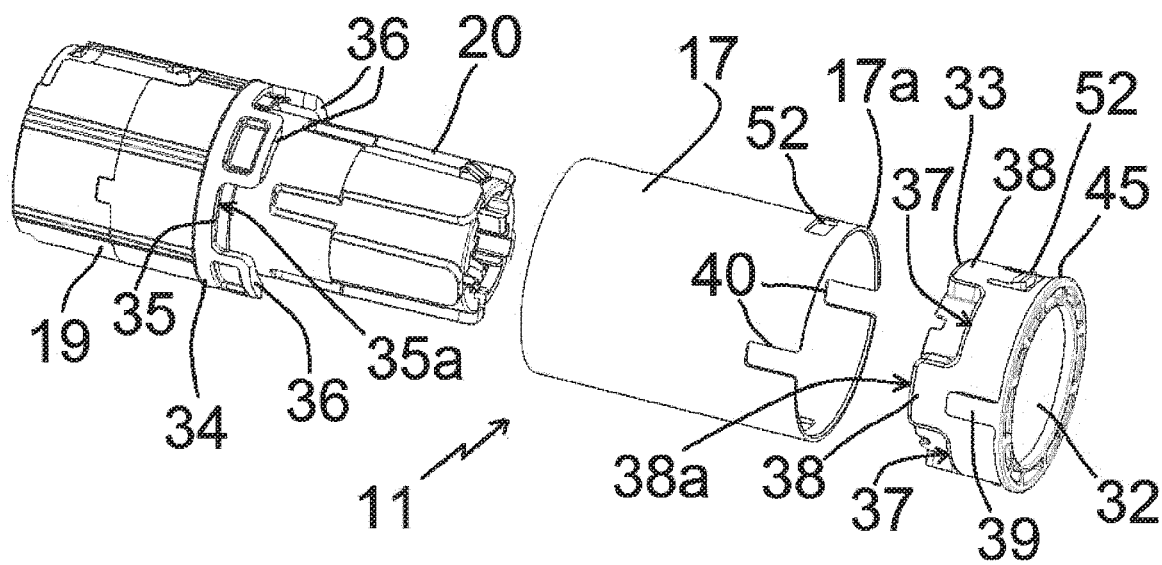
FIG. 9 is an exploded and perspective schematic view of part of the electromechanical actuator illustrated in FIGS. 4 and 5, showing part of a casing of the electromechanical actuator, a reduction gear, an output shaft, an endpiece and a retaining element.

In the exemplary embodiment illustrated in FIGS. 4, 5, 9 and 11, the assembly 27 and, more specifically, the reduction gear 19 comprises an endpiece 34 configured to cooperate with the retaining element 32, at the first end 17a of the casing 17, in the assembled configuration of the electromechanical actuator 11. In FIG. 9, only part of the casing 17 is shown, near its end 17a.

Here, the endpiece 34 comprises notches 35 and tongues 36, positioned alternating around the axis of rotation X, configured to cooperate, respectively, with tongues 38 and notches 37 of the retaining element 32.

Thus, the tongues 38 of the retaining element 32 are configured to engage in the notches 35 of the endpiece 34, in the assembled configuration of the electromechanical actuator 11. Furthermore, the tongues 36 of the endpiece 34 are configured to engage in the notches 37 of the retaining element 32, in the assembled configuration of the electromechanical actuator 11.

In such a case, the first stop 33 of the retaining element 32 configured to cooperate with the assembly 27 and, more specifically, with the reduction gear 19, in the assembled configuration of the electromechanical actuator 11, is produced by an end wall 38a of each of the tongues 38, these end walls 38a bearing against the bottom walls 35a of each of the notches 35 of the endpiece 34.

Here, the endpiece 34 comprises four notches 35 that are angularly offset by an angle of 90°, around the axis of rotation X, and four tongues 36 that are angularly offset by an angle of 90°, around the axis of rotation X. Furthermore, the retaining element 32 comprises four notches 37 that are angularly offset by an angle of 90°, around the axis of rotation X, and four tongues 38 that are angularly offset by an angle of 90°, around the axis of rotation X.

The number and the angular position of the notches and tongues of the endpiece and of the retaining element are not limiting and can be different, in particular, these notches and tongues can be three in number and angularly offset by an angle of 120° about the axis of rotation.

Furthermore, the retaining element 32 comprises indentations 39, each in the form of a radial protrusion, configured to cooperate with first recesses 40 of the casing 17. The first recesses 40 are arranged at the first end 17a of the casing 17.

Here, the retaining element 32 comprises two diametrically opposite indentations 39 relative to the axis of rotation X. Furthermore, the casing 17 comprises two first recesses 40 that are diametrically opposite relative to the axis of rotation X.

In this way, such an assembly of the endpiece 34, the retaining element 32 and the casing 17 makes it possible to block the rotation of the assembly 27 relative to the casing 17 and, more specifically, the reduction gear 19 relative to the casing 17.

Advantageously, the retaining element 32 comprises a second stop 45 configured to cooperate with the casing 17, at the first end 17a of the casing 17, in the assembled configuration of the electromechanical actuator 11.

Thus, the second stop 45 of the retaining element 32 makes it possible to limit the pushing in of the retaining element 32 in the casing 17.

Here, the second stop 45 of the retaining element 32 is made in the form of a flange ring, in particular with a cylindrical and planar shape, perpendicular to the axis of rotation X, in the assembled configuration of the electromechanical actuator 11.

Furthermore, the retaining element 32 and the casing 17 are also assembled to one another using fastening elements 52, in particular by resilient snapping.

Thus, the assembly of the retaining element 32 with the casing 17 makes it possible to block the translation of the retaining element 32 and, more specifically, the assembly 27 relative to the casing 17 and, more specifically, relative to the first end 17a of the casing 17.

In this way, following the fastening of the retaining element 32 with respect to the casing 17, the retaining element 32 serves as a stop for the assembly 27, during the sliding of the assembly 27 inside the casing 17, along the axial direction of the electromechanical actuator 11, from the second end 17b of the casing 17 toward the first end 17a of the casing 17.

Furthermore, the closure element 21 and, more specifically, the first part 21a of the closure element 21, comprises indentations 41, each in the form of a radial protrusion, configured to cooperate with second recesses 42 of the casing 17. The second recesses 42 are arranged at the second end 17b of the casing 17.

Here, the first part 21a of the closure element 21 comprises two diametrically opposite indentations 41 relative to the axis of rotation X. Furthermore, the casing 17 comprises two second recesses 42 that are diametrically opposite relative to the axis of rotation X.

In this way, such an assembly of the closure element 21 and the casing 17 makes it possible to block the rotation of the closure element 21 relative to the casing 17.

Furthermore, the closure element 21 and the casing 17 are also assembled to one another using fastening elements 53, in particular by screwing.

In this way, the assembly of the closure element 21 with the casing 17 makes it possible to block the translation of the closure element 21 relative to the casing 17 and, more specifically, relative to the second end 17b of the casing 17.

Here, the fastening of the closure element 21 with the casing 17 is carried out using fastening screws 53, which may, for example, be of the self-tapping type. In the assembled configuration of the electromechanical actuator 11, the fastening screws 53 pass through passage holes 54 arranged in the casing 17 and are screwed in fastening holes 55 of the closure element 21. Furthermore, the fastening screws 53 pass through passage holes 56 arranged in the crown 28.

In a variant, not shown, the fastening elements of the closure element 21 with the casing 17 can be rivets or fastening elements by resilient snapping.

Figure 6:
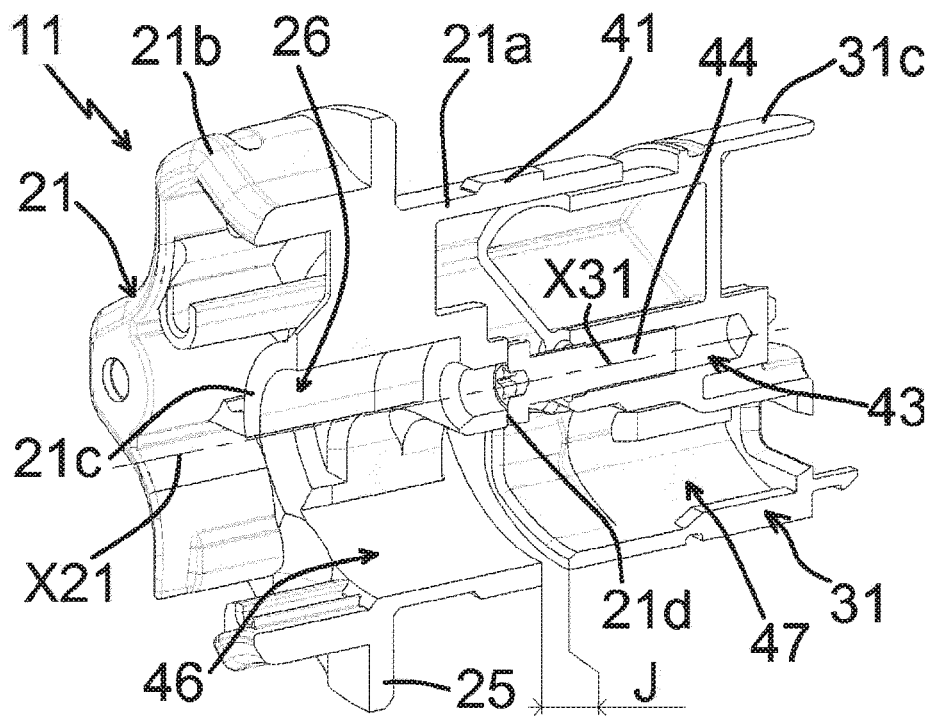
FIG. 6 is a sectional and perspective schematic view of part of the electromechanical actuator illustrated in FIGS. 4 and 5, showing a closure element, an interface element and an inhibiting element.
Figure 7:
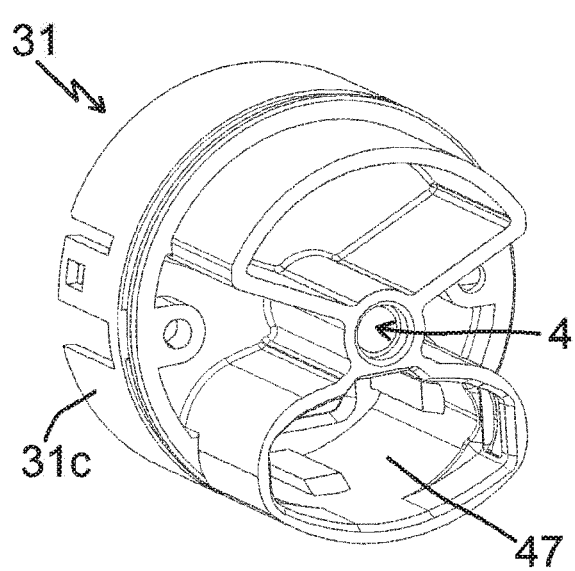
FIG. 7 is a perspective schematic view of the interface element illustrated in FIG. 6.
Figure 8:
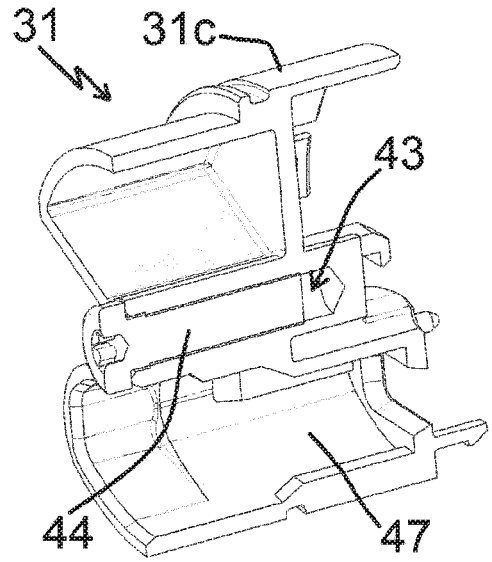
FIG. 8 is a cross-sectional and perspective schematic view of the interface element illustrated in FIG. 7, on which the inhibiting element is assembled.

Such an assembly of the electromechanical actuator 11 makes it possible to provide play J, in particular axial, between the closure element 21 and the interface element 31, along the axial direction of the electromechanical actuator 11, as illustrated in FIGS. 5 and 6.

The play J makes it possible to guarantee the assembly of the closure element 21 relative to the casing 17.

Here and non-limitingly, the play J between the closure element 21 and the interface element 31, along the axial direction of the electromechanical actuator 11, can be of the order of plus or minus two millimeters.

The interface element 31 comprises a first accommodation 43 inside which an inhibiting element 44 is positioned inhibiting the play J between the closure element 21 and the interface element 31, along the axial direction of the electromechanical actuator 11.

Thus, the inhibiting element 44 of the play J between the closure element 21 and the interface element 31, along the axial direction of the electromechanical actuator 11, makes it possible to improve the holding of the members 31, 15, 16, 19, 24, 20 of the electromechanical actuator 11 that are positioned inside the casing 17 and to eliminate the risk of electrical disconnection of the electronic control unit 15 with respect to the electrical power cable 18 and with respect to the electric motor 16, in particular upon impact of the electromechanical actuator 11, which may occur during a manipulation or the transport of the electromechanical actuator 11, or during abnormal operation of the electromechanical actuator 11.

In this way, such a construction of the electromechanical actuator 11 makes it possible to inhibit the play J between the closure element 21 and the interface element 31, along the axial direction of the electromechanical actuator 11, following the assembly of the electromechanical actuator 11, so as to guarantee a functional state of the electromechanical actuator 11, during different phases in the lifetime of the electromechanical actuator 11.

Furthermore, the inhibiting element 44 makes it possible to block the translation of the interface element 31 relative to the closure element 21.

Here, the first accommodation 43 of the interface element 31 has a generally cylindrical shape, centered on a longitudinal axis X31 of the interface element 31.

Furthermore, the longitudinal axis X31 of the interface element 31 is combined with the rotation axis X of the electric motor 16 of the electromechanical actuator 11, or the rotation axis of the winding tube 4, in the mounted configuration of the motorized driving device 5.

Preferably, the closure element 21 comprises a first accommodation 26 emerging at a first face 21c of the closure element 21 and at a second face 21d of the closure element 21.

The first accommodation 26 of the closure element 21 is positioned opposite the inhibiting element 44, in the assembled configuration of the electromechanical actuator 11, so as to allow a position adjustment of the inhibiting element 44 from the outside of the closure element 21.

Thus, the position adjustment of the inhibiting element 44 with respect to the interface element 31 and the closure element 21, along the axial direction of the electromechanical actuator 11, can be carried out from the outside of the closure element 21 and, more specifically, of the electromechanical actuator 11, by maneuvering the inhibiting element 44 using a tool, not shown, such as a screwdriver, that passes through the first accommodation 26 of the closure element 21, as explained hereinafter.

In this way, the positioning of the inhibiting element 44 relative to the interface element 31 and the closure element 21, along the axial direction of the electromechanical actuator 11, can be carried out as a function of the value of the play J, without having to disassemble one or several elements of the electromechanical actuator 11.

Here, the first accommodation 26 of the closure element 21 has a generally cylindrical shape, centered on a longitudinal axis X21 of the closure element 21.

Furthermore, the longitudinal axis X21 of the closure element 21 is combined with the rotation axis X of the electric motor 16 of the electromechanical actuator 11, or the rotation axis of the winding tube 4, in the mounted configuration of the motorized driving device 5. Furthermore, the longitudinal axis X21 of the closure element 21 is combined with the longitudinal axis X31 of the interface element 31, in the assembled configuration of the electromechanical actuator 11.

Advantageously, the inhibiting element 44 is configured to cooperate with a face of the closure element 21 and, more specifically, the second face 21d of the closure element 21, following a position adjustment of the inhibiting element 44 relative to the closure element 21, along the axial direction of the electromechanical actuator 11, so as to inhibit the play J between the closure element 21 and the interface element 31.

Thus, the inhibition of the play J between the closure element 21 and the interface element 31 is implemented by the position adjustment of the inhibiting element 44 relative to the interface element 31 and the closure element 21, along the axial direction of the electromechanical actuator 11 and, more specifically, the bearing of the inhibiting element 44 against the second face 21d of the closure element 21.

Preferably, the inhibiting element 44 is a screw. Furthermore, the first accommodation 43 of the interface element 31 is a bore.

Here, the inhibiting element 44 is a screw having a metric thread. Furthermore, the first accommodation 43 of the interface element 31 is a tapped bore.

In a variant, not shown, the inhibiting element 44 is a self-tapping screw. In this case, the first accommodation 43 of the interface element 31 is a smooth bore.

In one exemplary embodiment, the screw forming the inhibiting element 44 is a screw identical to the screws forming the fastening elements 53 of the closure element 21 with the casing 17.

Thus, the number of screw models for manufacturing the electromechanical actuator 11 is limited, so as to simplify industrialization and avoid reference error risks.

In practice, a head of the screw forming the inhibiting element 44 is configured to cooperate with the second face 21d of the closure element 21, following unscrewing of the screw 44 relative to the bore 43 of the interface element 31, so as to inhibit the play J between the closure element 21 and the interface element 31.

Advantageously, the first accommodation 26 arranged in the closure element 21 allows the passage of a tool, in particular a screwdriver, so as to reach the inhibiting element 44 and, more specifically, to allow the unscrewing of the screw forming the inhibiting element 44.

Preferably, the inhibiting element 44 is assembled on the interface element 31 before the assembly 27 is introduced inside the casing 17.

Thus, the operation to assemble the inhibiting element 44 on the interface element 31 does not cause an extension of the time to assemble the assembly 27 inside the casing 17, since this operation can be carried out during hidden time, during the manufacturing of the electromechanical actuator 11.

Here, the screw 44 is screwed to the inside of the first accommodation 43 of the interface element 31 before the assembly 27 is introduced inside the casing 17, in particular until the head of the screw 44 is made to bear against the rim of the first accommodation 43 of the interface element 31.

Advantageously, the closure element 21 comprises a second accommodation 46. The second accommodation 46 of the closure element 21 is configured to allow the passage of the electrical power cable 18.

Furthermore, the interface element 31 comprises a second accommodation 47. The second accommodation 47 of the interface element 31 comprises part of the first electrical connector 48. The first electrical connector 48 arranged in the second accommodation 47 of the interface element 31 is configured to cooperate with an electrical connector of the electrical power cable 18.

Furthermore, the first electrical connector 48 of the interface element 31 is electrically coupled to the electronic control unit 15, using electrical connection elements, in particular using electrical pins, not shown, configured to cooperate with tracks of the electronic board 29 of the electronic control unit 15.

Thus, the electrical connector of the electrical power cable 18 is configured to cooperate with the first electrical connector 48 of the interface element 31, so as to supply electrical energy to the electric motor 16, using the electrical power cable 18.

In one exemplary embodiment, not shown, the second accommodation 46 of the closure element 21 is also configured to allow the passage of a data exchange cable.

In this case, the interface element 31 comprises a third accommodation. The third accommodation of the interface element 31 comprises a second electrical connector. The second electrical connector arranged in the third accommodation of the interface element 31 is configured to cooperate with an electrical connector of the data exchange cable.

Furthermore, still in this case, the second electrical connector of the interface element 31 is electrically coupled to the electronic control unit 15, using electrical connection elements, in particular using electrical pins, not shown, configured to cooperate with tracks of the electronic board 29 of the electronic control unit 15.

In such a case where the electromechanical actuator 11 is coupled to the data exchange cable, the latter allows the electronic control unit 15 to receive and/or send data with a control unit, in particular with the local control unit 12 and/or the central control unit 13, via a wired link.

Thus, the electrical connector of the data exchange cable is configured to cooperate with the second electrical connector of the interface element 31, so as to exchange data between at least one of the control units 12, 13 and the electronic control unit 15.

We now describe a method for assembling the tubular electromechanical actuator 11 according to a first embodiment of the invention.

The assembly method comprises a step for assembling the assembly 27 to the outside of the casing 17, from the electronic control unit 15, the electric motor 16, the reduction gear 19, the output shaft 20 and, optionally, the brake 24.

Thus, the assembling of the assembly 27 from the various members 15, 16, 19, 24, 20 and, more specifically, the fastening thereof to one another via the fastening elements 50, is carried out outside the casing 17.

Then, the method comprises a step for introducing the assembly 27 inside the casing 17, from the second end 17b of the casing 17 and until the output shaft 20 protrudes relative to the first end 17a of the casing 17, in other words, past the first end 17a of the casing 17.

After the step for assembling the assembly 27, from various members 15, 16, 19, 24, 20, and before the step for introducing the assembly 27 inside the casing 17, the method comprises a step for assembling an interface element 31 on the electronic control unit 15 belonging to the assembly 27.

Thus, following the assembling of the assembly 27 from the various members 31, 15, 16, 19, 24, 20 and, more specifically, the fastening thereof to one another via the fastening elements 50, the assembly 27 is introduced inside the casing 17 from the second end 17b of the casing 17 until the output shaft 20 protrudes relative to the first end 17a of the casing 17, following a translational movement. The translational movement of the assembly 27 inside the casing 17 is illustrated by arrows F in FIG. 11. This is an axial translation along the rotation axis X.

Here, in the assembled state of the assembly 27 from the members 31, 15, 16, 19, 24, 20, the assembly 27 is implemented without axial travel of these members 31, 15, 16, 19, 24, 20 relative to one another, aside from the assembly tolerances of these members 31, 15, 16, 19, 24, 20 relative to one another, since these members 31, 15, 16, 19, 24, 20 are fastened to one another using fastening elements 50.

Advantageously, before the step for introducing the assembly 27 inside the casing 17, the method comprises a step for assembling the retaining element 32 on the casing 17, at the first end 17a of the casing 17.

Advantageously, after the introduction of the assembly 27 inside the casing 17, the method comprises a step for causing the reduction gear 19 belonging to the assembly 27 to bear against the second stop 45 of the holding element 32.

After the assembly 27 is introduced inside the casing 17, the assembly 27 is blocked in rotation and translation relative to the casing 17, in particular by the retaining element 32 serving as stop.

Following the assembly step of the interface element 31 on the electronic control unit 15, in the step for introducing the assembly 27 inside the casing 17 and, more specifically, in the step for causing the reduction gear 19 to bear against the second stop 45 of the retaining element 32, the method comprises a step for assembling the closure element 21 on the casing 17, at the second end 17b of the casing 17, such that the interface element 31 is positioned between the closure element 21 and the electronic control unit 15.

Thus, following the blocking of the rotation and translation of the assembly 27 relative to the casing 17, the closure element 21 is partially introduced inside the casing 17 until the stop 25 of the closure element 21 bears against the second end 17b of the casing 17, blocked in rotation, in particular by the introduction of indentations 41 of the closure element 21 into the second recesses 42 of the casing 17, then blocked in translation relative to the casing 17, by the fastening of the closure element 21 with the casing 17, in particular using fastening elements 53.

Advantageously, the step for assembly of the closure element 21 on the casing 17 comprises a sub-step for causing the stop 25 of the closure element 21 to bear against the casing 17, in particular against the second end 17b of the casing 17, and a sub-step for fastening the closure element 21 with the casing 17, in particular by screwing.

After the step for assembling the closure element 21 on the casing 17, the method comprises a step for inhibiting the play J between the closure element 21 and the interface element 31, along the axial direction of the electromechanical actuator 11, by means of the inhibiting element 44 positioned inside the first housing 43 arranged in the interface element 31.

Advantageously, the step for inhibiting the play J between the closure element 21 and the interface element 31 comprises a sub-step for adjusting the position of the interface element 31 relative to the closure element 21 and, more specifically, of the inhibiting element 44 relative to the closure element 21, along the axial direction of the electromechanical actuator 11.

Thus, following the blocking of the rotation and translation of the closure element 21 relative to the casing 17, the play J between the closure element 21 and the interface element 31 is reacted using the inhibiting element 44, along the axial direction of the electromechanical actuator 11.

Preferably, in the case where the inhibiting element 44 is a screw and the first housing 43 of the interface element 31 is a bore, the sub-step for adjusting the position of the inhibiting element 44 relative to the closure element 21 is carried out by an operation for unscrewing the screw 44 inside the bore 43.

In a variant, the sub-step for adjusting the position of the interface element 31 relative to the closure element 21 can be carried out by an operation for screwing the screw 44.

In such a case of inhibition of the play J by screwing and according to the second embodiment illustrated in FIG. 12, the inhibiting element 44 is configured to be screwed through the first accommodation 26 of the closure element 21, such that the inhibiting element 44 emerges inside the first accommodation 43 arranged in the interface element 31, then a second end of the inhibiting element 44 is configured to be made to bear against a wall 31a of the interface element 31, so as to inhibit the play J between the closure element 21 and the interface element 31, along the axial direction of the electromechanical actuator 11.

Here, the inhibiting element 44 is a pressure screw. Furthermore, the first accommodation 26 of the closure element 21 is a hole for fastening by screwing.

In such a case of inhibition of the play J by screwing and according to the third embodiment illustrated in FIG. 13, the inhibiting element 44 corresponds to at least one fastening element 53.

Here, the inhibition of the play J by screwing is implemented using only one of the two fastening elements 53. In a variant, not shown, the inhibition of the play J by screwing can be implemented using both fastening elements 53.

The fastening element 53 constituting the inhibiting element 44 is configured to be screwed through the first accommodation 43 arranged in the interface element 31, following the passage of this fastening element 53 through one of the passage holes 56 of the crown 28 and the screwing of the latter in one of the fastening holes 55 of the closure element 21, so as to inhibit the play J and, more specifically, to block the play J between the closure element 21 and the interface element 31, along the axial direction of the electromechanical actuator 11.

Here, the first accommodation 43 of the interface element 31 is positioned along a direction perpendicular to the rotation axis X and, more specifically, to the longitudinal axis X31 of the interface element 31.

Owing to the present invention, the inhibiting element of the play between the closure element and the interface element, along the axial direction of the electromechanical actuator, makes it possible to improve the holding of the members of the electromechanical actuator that are positioned inside the casing and to eliminate the risk of electrical disconnection of the electronic control unit with respect to the electrical power cable and with respect to the electric motor, in particular upon impact of the electromechanical actuator, which may occur during a manipulation or the transport of the electromechanical actuator, or during abnormal operation of the electromechanical actuator.

In this way, such a construction of the electromechanical actuator makes it possible to inhibit the play between the closure element and the interface element, along the axial direction of the electromechanical actuator, following the assembly of the electromechanical actuator, so as to guarantee a functional state of the electromechanical actuator, during different phases in the lifetime of the electromechanical actuator.

Many changes can be made to the example embodiment previously described without going beyond the scope of the invention. Furthermore, the considered embodiments and variants may be combined to generate new embodiments of the invention, without going beyond the scope of the invention.

The invention claimed is:

1. A tubular electromechanical actuator for a closure or sun protection home automation installation, the electromechanical actuator comprising at least:
   an assembly, the assembly comprising:
      an electronic control unit,
      an electric motor,
      a reduction gear, and
      an output shaft;
   a casing, the casing being hollow and configured to house the assembly, the casing comprising a first end and a second end, the second end being opposite the first end, the output shaft protruding past the casing at the first end of the casing, in an assembled configuration of the electromechanical actuator; and
   a closure element of the second end of the casing, the closure element protruding past the casing at the second end of the casing, in the assembled configuration of the electromechanical actuator, wherein,
   the electromechanical actuator also comprises an interface element, the interface element being arranged between the closure element and the electronic control unit with an axial play spacing being provided between the closure element and the interface element, and
   the interface element comprises a first accommodation, with an inhibiting element positioned within the first accommodation, the inhibiting element inhibiting an axial length of the axial play spacing between the closure element and the interface element along an axial direction of the electromechanical actuator along a major length of the electromechanical actuator which goes along a rotation axis of the casing extending from the second end of the casing toward the first end of the casing,
   wherein the axial play spacing is adjustable by adjustment of the inhibiting element, the inhibiting element is a screw and wherein the first accommodation of the interface element is a bore, and adjustment of the screw adjusts the axial play spacing.

2. The tubular electromechanical actuator for a closure or sun protection home automation installation according to claim 1, wherein the closure element comprises an accommodation emerging at a first face of the closure element and at a second face of the closure element, the accommodation of the closure element being positioned opposite the inhibiting element, in the assembled configuration of the electromechanical actuator, so as to allow a position adjustment of the inhibiting element from outside of the closure element.

3. The tubular electromechanical actuator for a closure or sun protection home automation installation according to claim 1, wherein the inhibiting element is configured to cooperate with a face of the closure element, following a position adjustment of the inhibiting element relative to the closure element, along the axial direction of the electromechanical actuator, so as to inhibit any change in the axial play spacing between the closure element and the interface element.

4. The tubular electromechanical actuator for a closure or sun protection home automation installation according to claim 1, wherein the closure element comprises a stop configured to cooperate with the casing, at the second end of the casing, in the assembled configuration of the actuator.

5. The tubular electromechanical actuator for a closure or sun protection home automation installation according to claim 1, wherein the electromechanical actuator also comprises a retaining element, the retaining element being assembled at the first end of the casing, the retaining element comprising a first stop configured to cooperate with the assembly, in the assembled configuration of the electromechanical actuator.

6. The tubular electromechanical actuator for a closure or sun protection home automation installation according to claim 5, wherein the retaining element comprises a second stop configured to cooperate with the casing, at the first end of the casing, in the assembled configuration of the electromechanical actuator.

7. The tubular electromechanical actuator for a closure or sun protection home automation installation according to claim 1, wherein,
the axial play spacing between the closure element and the interface element, along the axial direction of the electromechanical actuator, is adjustable within −2 millimeters and +2 millimeters of a nominal value.

8. The tubular electromechanical actuator for a closure or sun protection home automation installation according to claim 1, wherein,
the axial play spacing extends along the axial direction of the electromechanical actuator,
the interface element comprises the first accommodation, and
the inhibiting element inhibits any change in the axial play spacing between the closure element and the interface element along the axial direction of the electromechanical actuator.

9. A home automation installation for closing or providing sun protection that comprises a screen able to be wound on a winding tube rotated by a tubular electromechanical actuator, wherein said installation further comprises the tubular electromechanical actuator according to claim 1.

10. A tubular electromechanical actuator for a closure or sun protection home automation installation, the electromechanical actuator comprising at least:
an assembly, the assembly comprising:
an electronic control unit,
an electric motor,
a reduction gear, and
an output shaft;
a casing, the casing being hollow and configured to house the assembly, the casing comprising a first end and a second end, the second end being opposite the first end, the output shaft protruding past the casing at the first end of the casing, in an assembled configuration of the electromechanical actuator; and
a closure element of the second end of the casing, the closure element protruding past the casing at the second end of the casing, in the assembled configuration of the electromechanical actuator, wherein,
the electromechanical actuator also comprises an interface element, the interface element being arranged between the closure element and the electronic control unit with an axial play spacing being provided between the closure element and the interface element, and
the interface element comprises a first accommodation, with an inhibiting element positioned within the first accommodation, the inhibiting element inhibiting an axial length of the axial play spacing between the closure element and the interface element along an axial direction of the electromechanical actuator along a major length of the electromechanical actuator which goes along a rotation axis of the casing extending from the second end of the casing toward the first end of the casing, wherein,
the axial play spacing being adjustable by adjustment of the inhibiting element,
the first accommodation of the interface element is a bore, and
the inhibiting element is a screw located in the bore, the screw being adjustable to vary the axial play spacing by adjusting a position of the bore relative to the closure element through an unscrewing or a screwing operation of the screw.

11. The tubular electromechanical actuator for a closure or sun protection home automation installation according to claim 10, wherein,
the axial play spacing between the closure element and the interface element, along the axial direction of the electromechanical actuator, is adjustable within −2 millimeters and +2 millimeters of a nominal value.

12. A method for assembling a tubular electromechanical actuator for a closure or sun protection home automation installation, the electromechanical actuator comprising at least:
an assembly, the assembly comprising:
an electronic control unit,
an electric motor,
a reduction gear, and
an output shaft;
a casing, the casing being hollow and configured to house the assembly, the casing comprising a first end and a second end, the second end being opposite the first end, the output shaft protruding past the casing at the first end of the casing, in an assembled configuration of the electromechanical actuator; and
a closure element of the second end of the casing, the closure element protruding past the casing at the second end of the casing, in the assembled configuration of the electromechanical actuator,
the method comprising at least the following steps:
a) assembling the assembly to the outside of the casing,
b) introducing the assembly inside the casing, from the second end of the casing and until the output shaft protrudes relative to the first end of the casing, wherein the method also comprises at least:

after step a) for assembling the assembly and before step b) for introducing the assembly inside the casing, a step c) for assembling an interface element on the electronic control unit belonging to the assembly, after step c) for assembling the interface element on the electronic control unit and after step b) for introducing the assembly inside the casing, a step d) for assembling the closure element on the casing, at the second end of the casing, such that the interface element is positioned between the closure element and the electronic control unit, and after step d) for assembling the closure element on the casing, a step e) for inhibiting axial play spacing between the closure element and the interface element, along an axial direction of the electromechanical actuator along a major length of the electromechanical actuator which goes from the second end of the casing toward the first end of the casing, by means of an inhibiting element positioned inside a first accommodation arranged in the interface element, wherein the axial play spacing is adjustable by adjustment of the inhibiting element, the inhibiting element is a screw and wherein the first accommodation of the interface element is a bore, and adjustment of the screw adjusts the axial play spacing.

13. The method for assembling a tubular electromechanical actuator for a closure or sun protection home automation installation according to claim 12, wherein step e) for inhibiting the axial play spacing between the closure element and the interface element comprises a sub-step e1) for adjusting the position of the interface element relative to the closure element, along the axial direction of the electromechanical actuator.

14. The method for assembling a tubular electromechanical actuator for a closure or sun protection home automation installation according to claim 13, wherein the sub-step e1) for adjusting the position of the interface element relative to the closure element is carried out through an unscrewing or screwing operation of the screw.

* * * * *